United States Patent [19]

Hata

[11] 4,210,672
[45] Jul. 1, 1980

[54] PREPARATION OF YOGURT

[75] Inventor: Kosei Hata, Osaka, Japan

[73] Assignee: Seikenkai, Tondabayashi, Japan

[21] Appl. No.: 866,396

[22] Filed: Dec. 30, 1977

Related U.S. Application Data

[63] Continuation-in-part of Ser. No. 672,959, Apr. 2, 1976, abandoned.

[51] Int. Cl.$^2$ ............................ A23C 9/12; C12K 1/08; C12K 3/00
[52] U.S. Cl. ........................................ 426/43; 426/61; 435/832
[58] Field of Search .................... 426/34, 42, 43, 588, 426/61; 195/59

[56] References Cited

U.S. PATENT DOCUMENTS

| | | | |
|---|---|---|---|
| 3,009,861 | 11/1961 | Alderton et al. | 195/59 X |
| 3,080,236 | 3/1963 | Ferguson et al. | 426/61 |
| 3,897,307 | 7/1975 | Porabaan et al. | 426/61 X |

OTHER PUBLICATIONS

Frebisher, M., Fundamentals of Microbiology, 8th Ed., W. B. Sanders, Co., London, 1968 (pp. 394–396).

*Primary Examiner*—David M. Naff
*Attorney, Agent, or Firm*—Wenderoth, Lind & Ponack

[57] ABSTRACT

Yogurt is prepared with a mixture of milk powder and novel *Lactobacillus thermophilus* (also known as *Bacillus coagulans*) spores that have specific characteristics of requiring nourishment at the time of spore formation, being capable of high speed acid formation, taking a short time for transition into germ cells after budding and being highly thermobiotic so as to kill or inhibit during yogurt fermentation the growth of undesirable saprophytes including spore forming saprophytes present in yogurt which serve to putrify or spoil the yogurt. To prepare yogurt, boiling water is added to the mixture to kill or inhibit the growth of saprophytes and the mixture is permitted to ferment for a relatively short period of time.

5 Claims, No Drawings

PREPARATION OF YOGURT

CROSS REFERENCE TO RELATED APPLICATION

This application is a continuation-in-part of Ser. No. 672,959, filed Apr. 2, 1976, now abandoned.

BACKGROUND OF THE INVENTION

I. Field of the Invention

This invention relates to a material for and method of manufacturing yogurt using sporiferous lactic acid bacteria having highly thermobiotic characteristics and, more particularly, to a method which readily permits the household manufacture of yogurt.

II. Description of the Prior Art

While it has long been desired to prepare yogurt in the home, it has not been totally realized because of the special techniques required when dealing with lactic acid bacteria, such as sterilization and establishment of proper temperature and pH conditions for the culture. Also, special equipment is ordinarily required for such purposes. Although household preparation of yogurt has been tried in the past, such efforts typically result in very bad tasting putrified products.

SUMMARY OF THE INVENTION

In the light of the above, the present invention seeks to provide a material for preparing yogurt and a method of producing yogurt from that material with which even an amateur can prepare very tasty and health-giving yogurt with less possibility of intrusion of various miscellaneous Bacilli, i.e. by inhibiting the growth of the undesirable spores of saprophytes which cause putrefication of the yogurt. This is achieved by using spores of a novel sporiferous lactic acid bacteria having certain specific characteristics which will be subsequently described. An example of such bacteria used in the present invention is EC-1 bacterium, (Species No. 2,930), which species has been deposited at the Fermentation Institute of Japan, which is a public depository located at No. 8-1, Inage Higashi 5-chome, Chiba City, Chiba Prefecture, Japan.

The inventors, during their study on fermented drinks, have succeeded in separating homolactic fermentative lactobacilli, the spores of which have a great thermobiotic nature and which are highly active in the formation of lactic acid compared with those of conventional lactic acid bacteria. Also, they have succeeded in obtaining a genetically improved species capable of remaining alive in boiling water at 100° C. for more than four minutes and which are capable of practically a 100% transition into germ cells in three hours. They have named this lactic acid bacterium EC-1 bacterium, which is scientifically a variety of *Lactobacillus thermophillus*.

Before discussing the specifics of the bacterium used in the present invention, a brief discussion of microorganisms in this area would appear to be in order. Generally speaking, microorganisms are very weak to thermal exposure, similar to human beings. However, it is a wonderful providence among these microorganisms that there exists many species which generate "seeds" having superior anti-thermal properties within their own bodies, when the bodies reach maturation, in order to preserve their lives. This so-called "seed" is nothing but a spore as used in the present invention.

The sporiferous bacteria may generally be classified into two genera, depending upon the conditions in which they generate spores. The first genus is generally known as Bacillus which generates spores under aerobic conditions and the other genus is called Clostridium which generates spores under anaerobic conditions. That is, microorganisms which generate spores always belong to the class of microorganisms known as Bacillus or to the microorganisms known as Clostridium. Further, although spores generally are known to possess anti-thermal properties generally, the degree of anti-thermal properties varies considerably from one spore to the other due to the differences in the original strain. Thus, some spores lose their life in a relatively short time at a temperature of about 100° C., however, in other spores it is necessary to heat the spores at temperatures as high as 121° C. for long periods of time, such as 15 minutes or more in order to destroy the bacteria.

Among the lactic bacilli, i.e. the lactic acid-producing bacilli contemplated in the present invention, there exists so many strains which generate spores in the natural world that they hitherto have been known as *Lactobacillis thermophilus*. However, as pointed out above, microorganisms which generate spores should either be classified as Bacillus or Clostridium and the name of Lactobacillus is technically improper. Indeed, recent studies have led the scientific world to abandon the term *Lactobacillus thermophilus* and to more properly name it *Bacillus coagulans*. Accordingly, while the term *Lactobacillus thermophilus* and *Bacillus coagulans* may in some cases be used interchangably throughout the instant specification, it should be understood that the latter is the more technically correct nomenclature in connection with the understanding of such microorganisms.

The microorganism known as *Bacillus coagulans* generally produces spores under such culture conditions that the culture liquor contains a sufficient amount of inorganic salts and the nitrogen-containing organic nutriment with a very small amount of fermentative saccharides. Further, the pH of the liquor is near 7.0 and the culture is carried out at a temperature in the range of approximately 37° to 50° C. for two to four days under aerobic conditions. The conditions under which the Bacillus EC-1 of the present invention is cultured is similar but a little different from that involved in the culturation of the conventional Bacillus coagulans in that the generation of spores occurs to an extent of almost 100% of the bacilli after six days of culturation under aerobic conditions.

DESCRIPTION OF THE PREFERRED EMBODIMENTS

The biological features of the sporiferous lactic acid bacterium (particularly EC-1 bacterium) over the hitherto known sporiferous lactic acid bacteria are that (a) the bacterium of the present invention requires nourishment at the time of spore formation, budding and growth; (b) it has a high speed of acid formation; (c) it takes a short time for transition into germ cells after budding; and (d) its spores are highly thermobiotic. The other characteristics of the bacterium of the present invention are similar to those in the usual sporiferous lactic acid bacteria.

The above features (a) to (d) are definitely used to consistently produce satisfactory yogurt according to the present invention, which is virtually free from spoilage.

The particular species of *Bacillus coagulans* of the present invention, particularly the aforementioned Bacillus EC-1, has specific properties which make it ideal for the preparation of yogurt. These properties are as follows:

(1) the spores of Bacillus EC-1 can resist a wet thermal treatment as high as 100° C. for four minutes, (2) the necessary time for splitting from spores to germ cells is very short and is effected usually in a period as low as three hours, and (3) the germ cells of Bacillus EC-1 generate lactic acid very quickly which brings about a rapid decrease of the pH values of the culture medium for the preparation of yogurt which inhibits the growth of the miscellaneous microorganisms or saprophytes which cause putrefaction of the final product. For example, it only takes three hours until the pH value becomes 5.0 and about four hours before a pH of 4.5 is arrived at.

The reason why the above properties were chosen will now be discussed. Generally, the microorganisms which bring about the putrefaction or spoilage of milk can be classified into three groups, viz (1) miscellaneous bacteria or saprophytes which do not generate spores, (2) germ cells of Bacillus and Clostridium, and (3) the spores of Bacillus and Clostridium. In order to prevent the undesirable effects of these microorganisms in the preparation of yogurt, it is necessary to either prevent them from entering the culture medium in the first place or to render them ineffective in the culture medium.

In order to achieve the above effects, it is possible to kill the microorganisms designated (1) and (2) above by thermal treatment and this can be achieved by, e.g. heating the culture medium to a temperature of 100° C. for two minutes or less. This is the reason why applicants have chosen a lactic acid-producing bacterium which is such that the spores are resistant to destruction at temperatures of 100° C. for periods of more than two minutes. Such treatment, however, still leaves the spores of Bacillus and Clostridium designated (3) in the medium.

In order to inhibit the growth of the spores of Bacillus and Clostridium, i.e. the saprophytes designated (3) above, applicants have carefully selected spores of *Bacillus coagulans* in the present invention such that the spores always predominate or win in a struggle for existence under the conditions of culturation employed herein. In other words, while the spores of group (3) can resist thermal treatment at 100° C. for two minutes, the active growth of these undesirable spores of saprophytes becomes inferior when the culture medium is higher than 50° C. and especially if the temperature medium is retained at about 55° C. Further, the generation of lactic acid by the *Bacillus coagulans* chosen for the preparation of yogurt in the present invention, reduces the pH value of the culture medium rapidly to such a degree that the pH is quickly lowered to a point wherein the spores of group (3) designated above cannot survive or are greatly inhibited to avoid putrefaction.

In contrast to the *Bacillus coagulans* designated Bacillus EC-1 above, the *Bacillus coagulans* hitherto known are such that they are often defeated in the struggle for existence by the putrefactive bacteria described under (3) above and thus cannot be used reliably to consistently ferment yogurt. Furthermore, in the conventional *Bacillus coagulans* used prior to the present invention, there exists many strains which cannot resist wet thermal treatment at 100° C. for two minutes, the strains take a long time to split from spore to germ cell, i.e. the usual time is more than 5 hours, which means that the spores of saprophytes are afforded sufficient time to split into germ cells and because the rate of generation of lactic acid is not rapid, the rate of decrease of the pH value of the culture medium for the preparation of yogurt is very slow. Under such conditions, the germ cells of saprophytes designated (3) above are afforded a sufficient time to grow under such high pH conditions. For example, it takes more than five hours using the conventional *Bacillus coagulans* until the pH value becomes 5.0 and more than eight hours to arrive at a pH value of 4.5.

It can be seen by the above that the choice of the particular lactic acid-producing bacteria of the present invention was a very selective process. Indeed, the inventors examined more than 100 strains of bacteria which ordinarily are used to produce yogurt and the behaviors of these bacteria were examined. In this connection, the strains which hitherto have been used for the preparation of yogurt can be classified into three genera, viz they are (a) Streptococcus, (b) Lactobacillus, and (c) Bacillus. Among them, (a) Streptococcus and (b) Lactobacillus were discovered to be improper for use in the preparation of homemade yogurt because it is a known fact that these genera are too weak and upon exposure to heat at temperatures used to sterilize or pasteurize the miscellaneous microorganisms or saprophytes of the present invention, the genera (a) and (b) were completely destroyed under such conditions. Accordingly, the inventors choice was limited within the lactic acid bacteria belonging to the genus (c) Bacillus which can exist under such heating conditions because it forms spores which are resistant to destruction at such sterilization temperatures. From the standpoint of taxonomy, these bacteria are also classified under the general heading of *Bacillus coagulans*. Thus, the Bacillus EC-1 of the present invention is classified under the general heading of *Bacillus coagulans* together with other conventional genera on the market used for yogurt preparation as far as the taxonomy is concerned. However, while the taxonomy of the various species falling under the genus *Bacillus coagulans* are generally the same, they are indeed not the same in the rate of growth, antithermal properties and the rate of producing lactic acid.

According to the present inventors selective process, strains belonging to the Bacillus designated (c) above were selectively cultivated repeatedly for many times and a series of tests was carried out, the anti-thermal durabilities of the spores determined, the necessary time from spore to germ cell examined, the time required for sufficient growth after the formation of germ cells and the rate of generation of lactic acid were analyzed. As a result of such experimental tests, the particular strains of the bacillus having the properties discussed above were selected and particularly the Bacillus EC-1 was found to be ideally suited for producing yogurt although any bacillus satisfying the properties of heat resistance, generation of lactic acid, etc. within the limits discussed above can be employed.

The above characteristics of the EC-1 bacterium, the separation and culture of which have been accomplished by the inventors for use as an example of the sporiferous lactic acid bacterium in the invention, will now be compared in detail with the characteristics of conventional sporiferous lactic acid bacteria.

(A) Many well-known sporiferous lactic acid bacteria can grow solely on yeast extracts, inorganic salts or sugars or additionally with peptone and meat extracts. However, the EC-1 bacterium according to the present invention cannot grow on even the aggregates of these substances, but can only grow when it is cultured on a liquid or solid medium mainly composed of lactocasein and provided with fatty acid contained in protein or animal milk. For example, the conventional sporiferous lactic acid bacteria or *Bacillus coagulans* may be sporulated by innoculation on an agar slant that consists of 1% yeast extract, 0.1% peptone and 0.2% glucose as cultivation is effected at 37°-50° C. for two to four days.

In other words, the nourishment demand of EC-1 bacterium is such that it can hardly grow without the components of milk. The "components of milk" here mainly include lactocasein, lactoalbumin, lactogloblin, capric acid, oleic acid and sugar.

An example of a culture medium used to prepare the spores of the Bacillus EC-1 bacterium will now be described.

Preparation of Spores of the Bacillus EC-1

After charging 5 liters of a culture medium containing 0.5% yeast extract, 1% of peptone, 1% of skim milk or powdered milk, 0.1% of $MgSO_4 \cdot 7H_2O$, 0.1% of $KH_2PO_4$ and 0.3% of meat extract and having a pH value of 7.0 in a jar fermenter whose capacity is 10 liters and pasteurizing the contents with steam, 300 ml of Bacillus EC-1, which was separately cultured standing for 3 days in a culture medium whose composition was the same as mentioned above, is added into the fermenter and the culture is carried out for 6 days at 37° C., while introducing air into the culture medium at a rate of 0.5 VVM under an inner pressure at 0.5 atm. During this process, the culture medium was agitated by use of a turbine turning at the rate of 250 r.p.m.. According to this procedure, 10 g of spores of EC-1 in a wet state are obtained and recovered by the usual methods and germ cells scarcely exist in combination therewith. Where a small amount of germ cells co-exist with the spores, it is unnecessary to separate them from each other.

As indicated above, although a small amount of germ cells may co-exist with the spores, both can be used for the preparation of yogurt after drying in view of the fact that germ cells are destroyed when adding boiling water to the mixture of spores and germ cells during the yogurt-making process.

The above spores of EC-1 bacterium can be used to prepare yogurt simply and efficiently in the home by the following method.

In order to prepare about 200 ml of yogurt according to the present invention, a mixture of 0.1 g of the dried spores of the Bacillus EC-1 and 40 g of milk powder is introduced into a cup and 200 ml of boiling water or water of about 100° C. is poured onto the mixture and the content is allowed to stand for 7-8 hours at 50°-55° C. with the lid on the cup. By this method, yogurt can be prepared consistently without any failure.

(B) The period required until the budding of its spores is short compared to that of the usual sporiferous lactic acid bacteria, as is shown in Table 1. In the experiments, a typical culture medium for producing yogurt was utilized as described above with an approximately equal amount of spores of EC-1 and the spores of the conventional sporiferous lactic acid bacteria as recited in the table.

TABLE 1

Relation between the period required for spores to become germ cells and cell content Period required for spores to become germ cells (in hours)

| Germ cell content (%) | | 30 | 50 | 80 | 100 |
|---|---|---|---|---|---|
| Ancestor to EC-1 bacterium | | 3 | 3.5 | 4 | 5 |
| EC-1 bacterium | | 2 | 2.3 | 2.4 | 3 |
| Sporiferous lactic acid bacteria used for marketed fermented drinks | 1 | 4 | 5.5 | 6 | 7 |
| | 2 | 4 | 5 | 6 | 6.5 |
| | 3 | 3.5 | 4 | 5 | 6 |
| | 4 | 4 | 5.5 | 6 | 7 |
| | 5 | 3 | 3.5 | 4 | 5 |

It can be seen from Table 1 that the period required for the spores of EC-1 bacterium to become germ cells is considerably reduced compared to the ancestor to EC-1 bacterium and sporiferous lactic acid bacteria used for marketed fermented drinks.

(C) Table 2 below shows the acid forming capacity.

TABLE 2

Period required for acid formation and yogurt production in a typical yogurt producing medium as described above.

| | | Period (in hours) | | |
|---|---|---|---|---|
| Bacteria strain | | From germ cells to pH of 5.0 | From germ cells to coagulation of milk | From spores to coagulation of milk |
| EC-1 bacterium | | 3 | 3.5 | 7 |
| Sporiferous lactic acid bacteria used for marketed yogurt | 1 | 10 | 13 | 20 |
| | 2 | 9 | 12 | 18 |
| | 3 | 8 | 9 | 15 |
| | 4 | 9 | 12 | 18 |
| | 5 | 8 | 10 | 15 |

The EC-1 bacterium has extremely great proliferating and acid-forming capacities not only from spores but also from germ cells.

In respect to the EC-1 bacterium described in Table 1 above, this is prepared from an original strain of *Bacillus coagulans* (Bacillus EC-1), designated in the Table as the "Ancestor to EC-1 bacterium" by culturing the Bacillus EC-1 in a culture medium to prepare spores in the manner described above. The spores so-obtained are then treated thermally in a wet state at 100° C. for 2 minutes and those spores which are unable to withstand such temperatures are destroyed. The spores after such thermal treatment are then coated on a flat plate consisting of a culture medium for yogurt as described above with agar-agar added thereto. Cultivation is then carried out at 37° C. in an incubator. After the start-up of the cultivation, the state of growth on the plate is observed with the lapse of time and a colony which is formed at the earliest period is gathered. This is the first selection from the original strain. (Said spores grow to germ cells at first and then, the germ cells multiply by repeating cell divisions and at last a colony is formed.) The germ cells of Bacillus EC-1 thus-obtained are again added into a culture medium for the formation of spores, which is just the same as that used to cultivate the original strain of Bacillus EC-1.

The above steps are repeated again and again until a superior strain of Bacillus EC-1 is artificially produced which has the following characteristics:

(1) The spores of the artificially produced EC-1 bacterium are such that the necessary time for growth from spores to germ cells is short, being about three hours, (2) The rate of multiplication of the germ cells is rapid, such that the time required to coagulate milk is about three hours, and (3) The spores of the EC-1 bacterium have the ability to resist thermal treatment at 100° C. for two minutes or more.

The spores having the above characteristics (1)-(3) above are designated under the heading of "EC-1 bacterium" in Table 1 and are those spores advantageously used to consistently make excellent yogurt according to the present invention.

In regard to the separation of the sporiferous lactic acid bacteria used for marketed drinks in Table 1, this can be done in the following manner:

(1) Onto a culture medium of agar-agar containing skim milk, yeast extract and $CaCO_3$, a sample is coated, and culturation at 50° C. is carried out for four days.

(2) Among many colonies which appeared after the culturation, a colony whose circumference seems to be transparent due to the dissolution of the dispersed calcium carbonate reacted with lactic acid generated during the fermentation belongs to lactic acid bacterium. The colony is separated and culturation is repeated for further multiplication.

(3) The bacteria are then cultured in a culture medium for producing spores, which is just the same as described above under aerobic conditions until the spores are formed. Furthermore, in case the bacteria belong to the genus Bacillus of gram/positive type, the culture is examined to observe whether or not gas is generated (in, e.g. culture medium containing peptone, glucose and yeast extract) and if the generation of gas does not occur, it can be concluded that the *Bacillus coagulans* was used for the production of the drink. Thus, in this way, the separation of lactic bacillus in drinks existing on the market was carried out.

As typical examples of the sporiferous lactic acid bacteria used in the samples 1–5 of Tables 1 and 2, those used were the bacilli found in the following yogurts now on the market:
1. Morinaga Mamy,
2. Meiji Meipis,
3. Yukijirushi Yogurt,
4. Wiesby Lab (the seed from West Germany).
5. Kansai Yogurton.

(D) Tables 3A and 3B show the thermobiotic characteristics of the spores.

TABLE 3A

Thermobiotic characteristics of spores of EC-1 bacterium
(Temperature and period alive in minutes)

| Time (min.) Temp. (°C.) | 1 | 2 | 3 | 4 | 5 | 7.5 | 10 | 12.5 | 15 | 20 | 25 | 30 |
|---|---|---|---|---|---|---|---|---|---|---|---|---|
| 100 | + | + | + | + | − | − | − | − | − | − | − | − |
| 95 | + | + | + | + | + | + | − | − | − | − | − | − |
| 90 | + | + | + | + | + | + | + | − | − | − | − | − |
| 85 | + | + | + | + | + | + | + | + | + | − | − | − |
| 80 | + | + | + | + | + | + | + | + | + | + | + | + |

TABLE 3B

Thermobiotic characteristics of spores of marketed fermented drinks (at 100° C.)

| Time (min.) Strains | 1 | 2 | 3 | 4 | 5 |
|---|---|---|---|---|---|
| 1 | − | − | − | − | − |
| 2 | − | − | − | − | − |
| 3 | − | − | − | − | − |

TABLE 3B-continued

Thermobiotic characteristics of spores of marketed fermented drinks (at 100° C.)

| Time (min.) Strains | 1 | 2 | 3 | 4 | 5 |
|---|---|---|---|---|---|
| 4 | − | − | − | − | − |
| 5 | − | − | − | − | − |

It can be seen from the above Tables 3A and 3B that the spores of EC-1 bacterium used in accordance with the present invention are very thermobiotic and alive at 100° C. for four minutes, whereas the sporiferous lactic acid bacteria used for marketed fermented drinks completely perish when they are heated at 100° C. for only one minute, even in the form of sole spores.

It is obvious from the characteristics (A) to (D), mentioned above, that according to the present invention, it is possible to readily effect thermal sterilization and prevent intrusion and proliferation of saprophytes at the time of the yogurt manufacture compared to the prior art method of yogurt manufacture using conventional bacteria.

The following table illustrates the characteristic properties of a usual bacillus having the ability to generate spores, but not ordinarily used in the preparation of yogurt, and the properties of the "hitherto known" *Bacillus coagulans* conventionally used to produce yogurt were compared with the *Bacillus coagulans* used in the present invention.

TABLE 4

| Genus Item | Usual Bacillus having capacity to generate spores | Lactic acid Bacillus having capacity to generate spores (*Bacillus coagulans*) | |
|---|---|---|---|
| | | hither to known | present invention |
| Cell division at pH value of 5.0 | not possible | possible | possible |
| Durability of spore at 100° C. for 2 minutes | | sometimes durable | durable |
| Cell division and fermentation to produce lactic acid at 55° C. at pH of 4.5 | — | not possible | possible |
| Period of time from spore to cell division at 50° C. | — | >5 hours | <5 hours |
| Necessary time to coagulate milk with germ cell at 50° C. | — | >5 hours | <5 hours |
| Producing ability of lactic acid (concentration of lactic acid produced in a culture liquid) | — | weak-medium (max, 0.8%) | strong (>0.8%) |
| Final pH value (without passing air) | — | >4.0 | <4.0 |
| Ammonia producing ability | strong | weak | very weak |
| Conditions of sporulation | — | aerobic 2-4 days | aerobic 6 days |

In respect to the above Table 4, the term "hitherto known" represents the average characteristics of several strains of *Bacillus coagulans* which were tested by the inventors, the said strains being gathered from various parts of the world for testing.

The genus designated "Usual Bacillus" in Table 4 were those bacilli other than *Bacillus coagulans*.

The characteristics of the lactic acid bacillus used in the present invention are that the spores have an ability to resist or survive in boiling water for at least two minutes, cell division occurs within five hours and the coagulation of milk occurs within five hours after the cell division. In addition, the bacillus of the present invention is characterized in that lactic acid fermentation occurs rapidly in a temperature range of 50°–55° C. and the ability to form lactic acid is very strong in that the concentration of lactic acid produced in the culture medium is greater than 0.8%; the final pH of the solution during the fermentation process being below 4. In contrast thereto, none of the various strains of bacilli tested by the inventors possess all of these properties. Indeed, while some of the strains possess one or more of the properties that the present inventors have discovered to be necessary to produce satisfactory yogurt, none of the strains tested possess all of these properties, other than the Bacillus EC-1 material. Again, all of the characteristics delineated in the above table are necessary to consistently produce satisfactory yogurt in the home and the present invention is therefore a highly selective one.

The following Table 5 shows that by using the spores of the *Bacillus coagulans* according to the present invention, i.e. EC-1, it is possible to produce lactic acid quickly from the fermentation process without the production of undesirable saprophytes as in the case of conventional bacilli.

In the experimental tests shown in Table 5 above, the spores of various microorganisms, i.e. saprophytes, belonging to the genus Bacillus and also to Clostridium were gathered together and were mixed with the spores of Bacillus EC-1 and then after subjecting the mixture to a thermal treatment at 100° C. for two minutes, test cultures were carried out at 50° C. and 55° C. in order to determine the results of the struggle for existence between the spores of EC-1 and the spores of various saprophytes. By 340 spores of saprophytes per ml of culture medium, the increase of this number was observed after 5 hours and 10 hours and illustrated in Experiment Nos. 2 and 4.

For reference, two comparative experimental tests at 50° C. and 55° C. were carried out (Experiment Nos. 1 and 3 in the Table) under the same conditions as those of Experiments 2 and 4, except the spores of Bacillus EC-1 were not mixed therewith. Again, in each case, the number of spores of saprophytes per ml of culture medium was 340 and the increase in this number was observed after 5 hours and 10 hours.

The results of this Table can be summarized as follows:

In Experiment No. 1, it was observed that the number of spores of saprophytes increased from 340 to $3 \cdot 10^5$/ml after 10 hours of culturation. This means that putrefaction was rapidly progressing in the fermentation process. In Experiment No. 2 which contains both the saprophytes and EC-1 Bacillus of the present invention, the increase of the saprophytes was only up to 800 per ml of culture medium after 10 hours, which is only about two times the increase in relationship to the origi-

TABLE 5

Germination and Cell Division from Spores

| Temperature of culture | No. | Spores added | Composition of culture medium | Item examined | Period for culture | | |
|---|---|---|---|---|---|---|---|
| | | | | | 0 hrs | 5 hrs | 10 hrs |
| 50° C. | 1 | saprophyte | nutrient bouillon + 10 g of glucose | pH | 6.0 | 6.0 | 5.8 |
| | | | | spores | 340/ml of medium | 0/ml | 0/ml |
| | | | | spores + germ cells | | 620/ml | $3 \times 10^5$/ml |
| | | | | ∴ germ cells | | 620/ml | $3 \times 10^5$/ml |
| | | | | condition of culture medium | — | clear | clear |
| | 2 | saprophyte + EC-1 | nutrient bouillon + 10 g of glucose + 10 g of skim milk | pH | 6.0 | 6.0 | 6.0 |
| | | | | spores of saprophyte | 340/ml | 120/ml | 600/ml |
| | | | | spores + germ cells | | 420/ml | 800/ml |
| | | | | ∴ germ cells | | 300/ml | 200/ml |
| | | | | condition of culture medium | — | a little turbid | coagulated |
| 55° C. | 3 | saprophyte | nutrient bouillon + glucose | pH | 6.0 | 5.5 | 3.4 |
| | | | | spores | 340/ml | 0/ml | 0/ml |
| | | | | spores + germ cells | | 80/ml | 60/ml |
| | | | | ∴ cells | | 80/ml | 60/ml |
| | | | | condition of culture medium | — | clear | clear |
| | 4 | saprophyte + EC-1 | nutrient bouillon + glucose + skim milk | pH | 6.0 | 5.5 | 3.4 |
| | | | | spores of saprophyte | 340/ml | 20/ml | 20/ml |
| | | | | spores + germ cells | | 60/ml | 40/ml |
| | | | | ∴ cells | | 40/ml | 20/ml |
| | | | | condition of culture medium | — | a little turbid | coagulated | nal number of spores present. Here, it should be noted that the transformation of the culture medium to yogurt has already been completed after 10 hours and accordingly no further growth of saprophytes is possible, since there exists a sufficient amount of acid in the culture medium to prevent growth.

In Experiment No. 3 carried out at 55° C., the culture medium contained only the spores of saprophytes and after 10 hours, the number of spores was only 60 per ml of culture medium which is about 1/5 of the initial amount.

In Experiment No. 4, the competitive growth of the saprophytes in the presence of the Bacillus EC-1 was carried out at 55° C. The observed number of saprophytes after 10 hours of culturation was only about 1/8 of the initial number of spores. According to these conditions, excellent yogurt can be prepared.

DETAILED DESCRIPTION OF THE METHOD OF PRODUCING YOGURT IN THE HOME ACCORDING TO THE PRESENT INVENTION

In preparations where fermentation is brought about by various microorganisms, it is quite common to sterilize the medium and then innoculate it with the proper quantity of a given bacterial strain. In the manufacture of yogurt, it is also common to carry out steam sterilization of the medium at 120° C. or thereabouts for 20 to 30 minutes (or at 130° C. for 2 seconds) and then innoculate the medium with the bacterial strain.

Similar to this general method of manufacture, a typical method of household yogurt manufacture generally involves the steps of:

(a) sterilizing containers and spoons by boiling, (b) boiling whole or skim milk and then cooling it down to a temperature of approximately 40° C., and (c) dissolving the bacterial seeding in a portion of the cooled milk, cooling the resultant mixture again, adding it to the rest of the milk, agitating this mixture and leaving it at a certain temperature for fermentation.

Since the boiled milk is cooled down, followed by the addition of bacterial seeding, agitating the resultant mixture and leaving it at a predetermined temperature for fermentation, it is extremely difficult to prevent the intrusion of saprophytes.

By this method, therefore, it is difficult to rely on the production of good tasting yogurt. Particularly, it is important for homemade yogurt to meet such requirements that:

(a) it can be readily produced by a simple procedure, (b) it can be produced without failure, (c) it can be produced in a good sanitary condition as is usually the case with factory production of yogurt, (d) it can be obtained in a short period of time by fermentation, (e) it can be produced inexpensively, (f) it does not involve great difficulties in controlling the temperature for fermentation, (g) it tastes good, and (h) its fermentation bacteria have the effect of regulating the bowels and are healthy.

The EC-1 bacterium according to the present invention has spores which are strongly thermobiotic and are capable of remaining alive in boiling water at 100° C. while substantially all the saprophytes have perished.

Further, the period required until its spores change to active cells is as short as two and one half hours, which has heretofore been utterly unpredictable.

Actually, this period is shorter than the period required for inducing the proliferation of saprophyte, so there is no opportunity for the saprophytes to thrive and give adverse effects to the proliferation of the EC-1 bacterium. In other words, the EC-1 bacterium deprives the saprophyte of the chance to thrive.

The fact that the period is short from the transition of spores into active cells to schizogenetic proliferation and acid formation means that the decomposition of lactose and acid formation are quickly effected. Thus, even if spores of saprophytes are present, their growth is impeded by the quick pH reduction of the medium.

Furthermore, it is possible to use the same spores and powdery animal milk and add phosphoric acid to provide an acidic pH. This never impedes the growth of spores into germ cells, but rather promotes the growth, while having the effect of suppressing the growth of miscellaneous bacilli.

Saprophytes that do not perish at 100° C. are mostly sporiferous varieties of Bacillus and Clostridium genera. At present, however, there are considerable numbers of known varieties of these genera, the spores of which perish at 100° C.

Besides, surviving spores of saprophyte usually require a considerable amount of time before budding. By the time that they bud, their environment is already very bad because of an extremely reduced pH caused by the activity of the EC-1 bacterium of the present invention. The pH is lowered to such an extent that proliferation of the saprophytes is impossible.

Further, the sporiferous lactic acid bateria, to which EC-1 of the present invention belongs, are the aforementioned *Bacillus coagulans* genus which actively proliferate to produce lactose at around 50° C. In other words, the fact that the fermentation temperature of EC-1 bacterium is high makes it effective for impeding the proliferation of sporiferous miscellaneous bacilli.

Thus, the problems concerning saprophytes which are most significant when manufacturing yogurt are completely solved by the use of the EC-1 bacterium according to the present invention.

The period required for budding of spores is essentially unnecessary in the manufacture of yogurt. Rather, the period required for the growth of spores to germ cells is desirably as short as possible because any proliferation of saprophytes which might occur during this period would cause putrefaction and other possible dangers.

This period, however, cannot be infinitely reduced since bacteria are living creatures. In view of the general bacteriological consideration that the period required for spores to become germ cells is eight hours on the average in an acid medium, the results that nearly 100% of the spores of EC-1 bacterium according to the present invention become germ cells in three hours are utterly surprising.

In addition to the EC-1 bacterium in the present invention, there may be used as the bacterial seeding any lactic acid bacterium which meets three requirements, namely:

(a) that the period required until the budding of its spores is short compared to the usual sporiferous lactic acid bacteria and is within five hours, (b) that the acid-forming capacity is extremely great and acid formation occurs within five hours, (c) that its spores are highly thermobiotic and can survive heating in boiling water for more than two minutes, (d) that the spores have the capacity to generate germ cells in a period no longer than five hours, and (e) that the germ cells have the capacity to coagulate milk within a period no longer than five hours after the germ cells are generated.

The features of the present invention are summarized as follows:

(A) Of the sporiferous lactic acid bacteria, those which are strongly thermobiotic and will not be destroyed by boiling water are used.

(B) A bacterial seeding is used which has been realized, after biogenetical pursuit, as a bacteria being capable of quick transition from spores to germ cells, has a short period until formation of germ cells and which is unpredictable from conventional bacteriological knowledge. This bacterial seeding requires only five hours from its separation to budding and only three hours of growth from spores to germ cells without changing its thermobiotic character.

(C) Formation of yogurt by germ cells quickly results.

(D) Since spores are used for the product, the survival period of the bacteria is long, facilitating the molding of the product and thus permitting the obtainment of a high quality product.

(E) By deftly combining the features (A) to (D), it is possible to obtain homemade yogurt free from putrefaction.

(F) In view of the fact that a lactic acid bacterium is used, the pH of milk powder is set to the acid side to suppress and proliferation of miscellaneous bacilli.

While according to the present invention, the product may be dealt with the powder form, its press-molding into various shapes is also possible.

Examples of the present invention are set forth below.

EXAMPLE 1

A material was prepared from 30 g of non-fat milk powder, a certain quantity of condiments (i.e. 5 g of sugar plus spices), 0.2 g of $KH_2PO_4$, 0.2 g of fine agar powder, 0.5 g of dry yeast and 5 mg of EC-1 bacterium spores. The mixture thus-prepared was poured together with 200 ml of boiling water into a cup. Then, after sufficient agitation, the cup was closed with a lid and left on a warmer at a temperature of 40°–42° C. for about 7 hours to obtain excellent yogurt.

By using "Chlorella" (a tradename) in lieu of the dry yeast, coagulation resulted in substantially the same amount of time. Further, by adding a vegetable juice, e.g., "V-8" (tradename), in an amount of 10%, the coagulation period was reduced to about 6 hours and 45 minutes.

EXAMPLE 2

By adding 5 mg of EC-1 bacterium spores and 0.2 g of $KH_2PO_4$ to 200 ml of boiling milk containing coffee in the manner as described in Example 1, coagulated coffee yogurt was obtained, although the coagulation period was increased as compared with Example 1.

What is claimed is:

1. A product of a dry material consisting essentially of a major amount of milk powder and a minor amount of the spores of a *Bacillus coagulans* having highly thermobiotic characteristics, the bacillus having characteristics such that:

(a) the spores are able to exist in boiling water at 100° C. for more than two minutes;
    (b) the spores have the capacity to generate germ cells in a period no longer than five hours;
    (c) the germ cells have the capacity such that lactic acid fermentation occurs rapidly within four hours at about 50° C.;
    (d) the germ cells have characteristics such that the coagulation of milk occurs in a period no longer than five hours after the germ cells are formed;
    (e) the germ cells have the capacity to produce lactic acid in the final medium in a concentration more than 0.8%, and
    (f) the germ cells have the capacity to produce a final pH in the culture medium of a fermentation process of below 4.0.

2. A product of a dry material according to claim 1, wherein the spores of the *Bacillus coagulans* are the spores of Bacillus EC-1, Species No. 2,930.

3. A product of a dry material according to claim 1, wherein the germ cells of the *Bacillus coagulans* have the capacity to effect lactic acid fermentation within about three hours.

4. A method of producing yogurt comprising adding boiling water to the material of claim 1 and permitting the resulting composition to ferment.

5. A method according to claim 4, wherein after the addition of the boiling water, the resulting composition is permitted to ferment at a temperature of 40°–55° C. for about seven hours.

* * * * *